US006444350B1

(12) United States Patent
Toya et al.

(10) Patent No.: US 6,444,350 B1
(45) Date of Patent: *Sep. 3, 2002

(54) BATTERY UNIT WHICH CAN DETECT AN ABNORMAL TEMPERATURE RISE OF AT LEAST ONE OF A PLURALITY OF CELLS

(75) Inventors: Shoichi Toya, Mihara-gun; Hideki Okajima; Takashi Oda, both of Naruto; Tadashi Furukawa, Mihara-gun, all of (JP)

(73) Assignee: Sanyo Electronic Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/523,059

(22) Filed: Mar. 9, 2000

(30) Foreign Application Priority Data

| Mar. 12, 1999 | (JP) | ............................................. | 11-066860 |
| Aug. 6, 1999 | (JP) | ............................................. | 11-223281 |
| Oct. 19, 1999 | (JP) | ............................................. | 11-296041 |

(51) Int. Cl.[7] ............................................. H01M 10/48
(52) U.S. Cl. ............................... 429/90; 429/62; 429/92
(58) Field of Search ............................... 429/62, 90, 92

(56) References Cited

FOREIGN PATENT DOCUMENTS

| DE | 34 09 599 | 9/1984 | | |
| DE | 35 03 018 | 7/1986 | | |
| DE | 37 35 897 | 5/1989 | | |
| DE | 0568339 A1 | * 4/1993 | .......... | H01M/10/04 |
| DE | 43 09 070 | 9/1994 | | |
| DE | 693 01 549 | 6/1996 | | |
| EP | 0568339 | 4/1993 | | |
| EP | 1026758 A1 | * 12/1999 | ............ | H01M/2/10 |
| EP | 1026758 | 8/2000 | | |
| GB | WO 93/10590 | 5/1993 | | |
| JP | 04292869 | 10/1992 | | |
| JP | 10243565 | 9/1998 | | |
| JP | 10-270094 | 10/1998 | | |

* cited by examiner

Primary Examiner—Carol Chaney
Assistant Examiner—Dah-Wei Yuan
(74) Attorney, Agent, or Firm—Wenderoth, Lind & Ponack, L.L.P.

(57) ABSTRACT

A battery unit comprises a plural number of cells. The cells are provided with temperature sensors adjacent thereto respectively. One cell is provided with one temperature sensor adjacent thereto, but all of the cells are not provided with temperature sensors; so that the total number of temperature sensors is less than the total number of cells. Cells provided with temperature sensors adjacent thereto, respectively, and cells not provided with any temperature sensor are mixedly connected. The temperature sensors are divided into a plural number of temperature sensor blocks, and an abnormal temperature of a cell is detected by comparing resistance values of the temperature sensor blocks with one another.

13 Claims, 12 Drawing Sheets

FIG. 1

PRIOR ART

MEASURING OF
RESISTANCE VALUE

BATTERY UNIT WHICH CAN DETECT AN ABNORMAL TEMPERATURE RISE OF AT LEAST ONE OF A PLURALITY OF CELLS

This application is based on Application No. 11-66860 filed in Japan on Mar. 12, 1999, Application No. 11-223281 filed in Japan on Aug. 6, 1999, and Application No. 11-296041 filed in Japan on Oct. 19, 1999, the contents of which are incorporated hereinto by reference.

BACKGROUND OF THE INVENTION

The present invention relates to a battery unit in which a plural number of cells are connected in series or in parallel, and especially to a battery unit which can detect an abnormal temperature rise of at least one of a large number of cells constituting a battery unit for use in an electric car.

Battery units which are provided with temperature sensors such as PTC elements for detecting an abnormal temperature rise of a cell so as to prevent deterioration, heating trouble and the like of the cell from occurring are widely known.

Further, electric power devices for driving an electric car motor have been proposed, each of which contains a large number of cells electrically connected in series and can provide high voltage and high current. Also, electric power devices for use in electric cars, each of which is provided with temperature sensors, are known. Such an electric power device has been disclosed, for example, in Japanese Non-examined Patent Publication No. 270094/1998.

In the electric power device disclosed in the Publication, a temperature sensor is adhered to each of the cells constituting a battery unit, and an abnormal temperature rise is detected by measuring a total electric resistance of the temperature sensors.

However, the electric power device disclosed in this Publication requires the same number of temperature sensors as that of the cells constituting the device, since a temperature sensor is adhered to each of the cells. An electric power device for use in an electric car demanding high output and high voltage contains an extremely large number of cells, and therefore, it requires an extremely large number of temperature sensors.

As a result, such a device has a disadvantage that since its parts and assembling processes such as connecting processes of the temperature sensors increase in number, its manufacturing cost becomes high.

Therefore, a first object of the present invention is to provide a battery unit which comprises a large number of connected cells and can detect an abnormal temperature rise of a cell with a reduced number of temperature sensors adhered to the cells.

Figure 1:
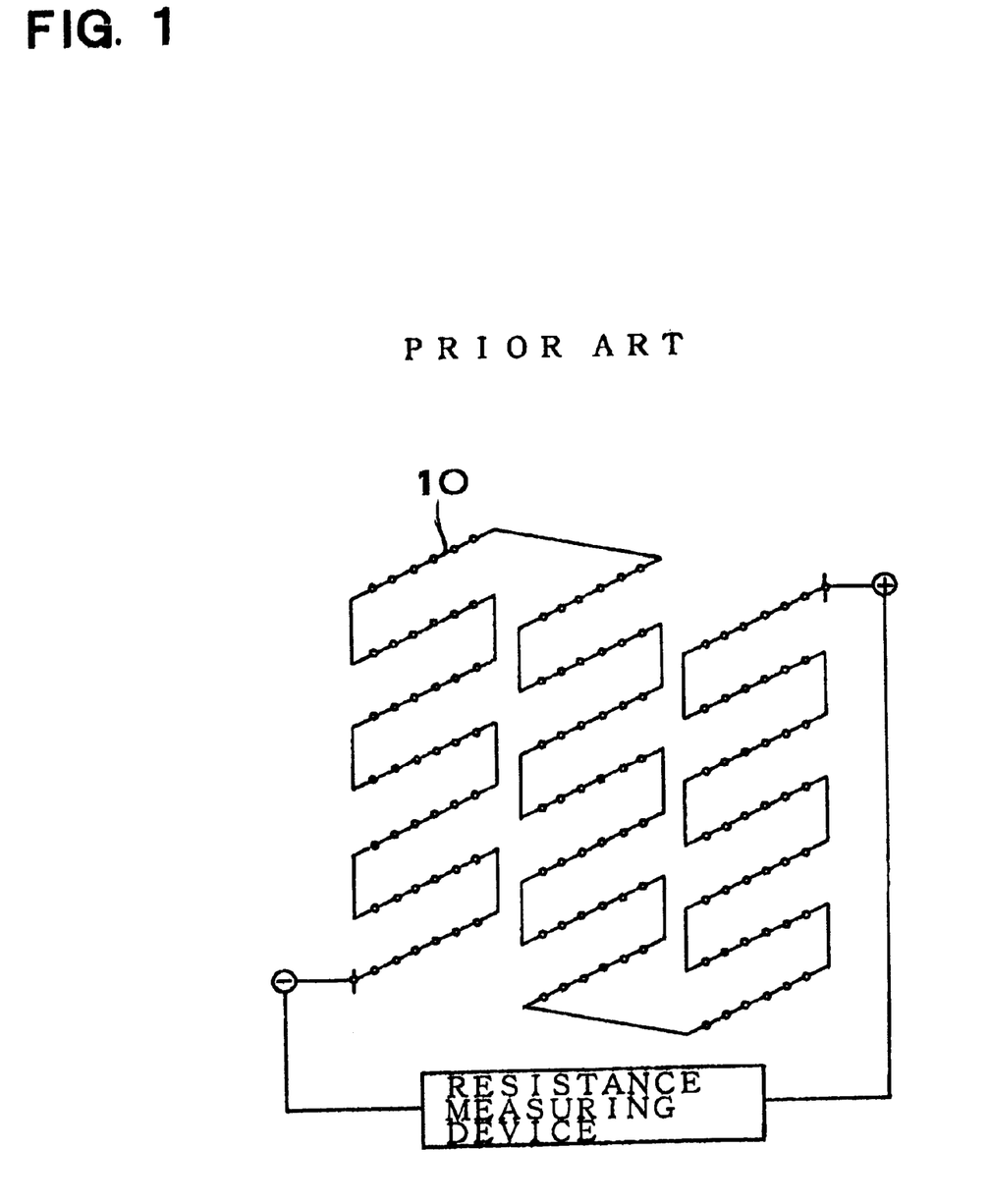
FIG. 1 is a connecting circuit diagram of a conventional abnormal temperature rise detecting device.

As shown in FIG. 1, the abnormal temperature rise detecting device disclosed in the Publication No. 270094/1998 has a PTC sensor 10 adhered to the outside of each of the cells constituting a battery unit, and all of the adhered PTC sensors 10 are connected in series to a resistance measuring device to measure total resistance of the PTC sensors. When at least one of the cells to which PTC sensors are adhered, respectively, receives an abnormal temperature rise, a resistance of a PTC sensor 10 adhered to the cell increases extremely, and the resistance measuring device detects the abnormality.

However, in the abnormal temperature rise detecting device disclosed in this Publication, all of the PTC sensors 10 adhered, respectively, to the cells are connected in series and total resistance of the connected PTC sensors 10 is measured to detect abnormal temperature rise. Here, each PTC sensor 10 has its inherent difference i.e. dispersion of temperature characteristic. Therefore, as the number of the connected PTC sensors increases, such dispersions of the PTC sensors 10 are summed up, and all of the dispersions of the PTC sensors 10 are added to the measured value of total resistance. Especially, as described in the Publication No. 270094/1998, when a temperature sensor is adhered to each of 126 or 252 cells constituting a battery source device for use in an electric car and total resistance of the temperature sensors is measured, the measured value contains an extremely large total of dispersions.

Consequently, if a cell receives an abnormal temperature rise and a resistance value of a PTC sensor adhered to the cell increases extremely, sometimes the increased resistance value cannot be detected since each PTC sensor has a dispersion as mentioned above. In addition, when these dispersions are taken into account and a threshold value for detecting an increase of resistance value is set as a high value including the dispersion value, the abnormal temperature rise cannot be detected until the resistance value rises above the threshold value, and there is a problem in that the detection of abnormal temperature rise takes a lot of time.

Further, in an abnormal temperature rise detecting device disclosed in the Publication, since all of PTC sensors adhered respectively to 126 cells are connected in series, it is impossible to detect which one of the 126 cells receives the abnormal temperature rise. Therefore, treatments such as mending and exchange of the cells and the device must be carried out over a wide range. Thus, this device has a disadvantage that maintenance, inspection and the like thereof cannot be rapidly achieved.

Therefore, a second object of the present invention is to provide a battery unit having an abnormal temperature rise detecting device which can precisely detect an abnormal temperature rise of a cell without being influenced by a dispersion of temperature characteristic of each temperature sensor, can rapidity detect a resistance value increase caused by an abnormal temperature rise to reduce detecting time, and can detect an abnormal temperature rise of a cell in rather a small range even if the device is used in an electric power device comprising a plural number of cells, so that treatment for the abnormality, maintenance and inspection of the device and the like can be rapidly carried out.

SUMMARY OF THE INVENTION

A battery unit according to the present invention comprises a large number of cells connected in series or in parallel. Temperature sensors for detecting cell temperature are respectively adhered to cells constituting the battery unit. One temperature sensor is adhered to one cell, but temperature sensors are not adhered to all of the cells. In a battery unit having this structure, a lower number of temperature sensors than that of a number of connected cells are provided, and cells adjacently provided with temperature sensors, respectively, and cells not provided with temperature sensors are mixedly connected. The temperature sensors are a PTC sensors or a thermistors.

Each of the cells not provided with any temperature sensor may be provided with a heat collecting member for collecting a temperature of the cell and transferring temperature data of the cell to a temperature sensor. In this battery unit, a cell provided with a temperature sensor and a cell provided with a heat collecting member are connected adjacent to each other. A temperature sensor is preferably disposed at a position on the surface of a cell near the adjacent cell provided with a heat collecting member.

A main material of the heat collecting member is one selected from the group consisting of iron, nickel, copper, aluminum and an alloy containing one of these metals.

Further, the battery unit comprises a plural number of cells each provided with a temperature sensor and cells each provided with a heat collecting member, wherein the temperature sensors adhered to the cells can be electrically connected in series to one another through the heat collecting members.

In the battery unit mentioned above, each of the cells provided with a heat collecting member is preferably disposed between the cells provided with a temperature sensor. Further, in the battery unit mentioned above, a temperature sensor may be disposed between two adjacent cells and heat collecting members may be respectively provided on the cells on both sides of the temperature sensor. In such a battery unit, since a heat collecting member is provided on the surface of a cell and connected to a temperature sensor, cell temperature is collected by the heat collecting member and transferred to the temperature sensor. Thereby, the heat collecting member can detect abnormal temperature rise of a cell. As a result, by connecting a lower number, not the same number, of temperature sensors than a number of the cells constituting the battery unit, the abnormal temperature rise of all of the cells can be detected.

Consequently, the battery unit can reduce the number of temperature sensors and thereby, assembling processes and parts of the battery unit can be reduced in number, so that manufacturing cost thereof can be lowered.

Further, according to the present invention, since temperature sensors are divided into small blocks and a control unit detects abnormality of each of the small blocks, abnormality can be detected in a rather small range of the small block with a lower number of temperature sensors than the number of cells connected in the battery unit.

Further, a battery unit according to the present invention is provided with a plural number of cells and an abnormal temperature rise detecting device comprising temperature sensors adhered respectively to the cells, a resistance of each temperature sensor changing during a temperature rise, and an abnormal temperature rise detecting circuit for measuring a resistance value of the temperature sensors and detecting abnormal temperature rise of a cell. The temperature sensors are divided into a plural number of temperature sensor blocks. In each sensor block, a same number of temperature sensors are connected in series. On the other hand, the abnormal temperature rise detecting circuit detects abnormal temperature rise by comparing resistance values of the temperature sensor blocks with each other.

In a battery unit having this structure, a plural number of temperature sensors are divided into temperature sensor blocks, and resistance values of the temperature sensors are respectively measured. When a difference between the resistance values becomes above a predetermined value, an abnormality of a cell is detected.

According to the present invention, since resistance values of the temperature sensor blocks are compared with one another, differences i.e. dispersions of temperature characteristic of the temperature sensors can be offset. Therefore, when any one of the cells receives an abnormal temperature rise and resistance value of a PTC sensor adhered to the cell increases extremely, only the increased value can be precisely detected. As a result, the abnormality can be detected precisely and without errors, free from the influence of dispersions of temperature sensors such as PTC sensors.

In addition, since dispersions of temperature sensors are off set, it is not necessary to set a set value of difference between resistance values of temperature sensors for detecting abnormal cell temperature to be unnecessarily large. Thereby, the abnormal temperature rise detecting device can sensitively react to an increase of resistance value, and the detecting time can be shortened.

In addition, since the temperature sensors such as PTC sensors are divided into temperature sensor blocks, if an abnormal temperature rise is caused in any one of a large number of cells, the detection can be carried out in every temperature sensor block and thereby, treatment such as mending or exchange can be achieved in a rather narrow range to speed up the maintenance inspection and the like.

As a result, a battery unit having this structure can precisely and rapidly detect an abnormal temperature rise of a cell when it is used as a battery source which comprises an extremely large number of connected cells for an electric car or a hybrid type car. Further, the battery unit is safe and is easily maintained and inspected, so that it can be easily treated as a battery source for an electric car and the like.

The above and further objects and features of the present invention will more apparent from the following detailed description with accompanying drawings.

DETAILED DESCRIPTION OF THE INVENTION

Embodiments of the present invention will be described in the following with reference to the appended drawings. A battery unit shown in FIG. 2 comprises six cylindrical cells 1 which are all longitudinally connected in series to form a cylindrical shape. Each cell 1 comprise a nickel hydrogen cell, but may comprise nickel-cadmium cell or a lithium ion cell.

Figure 2:
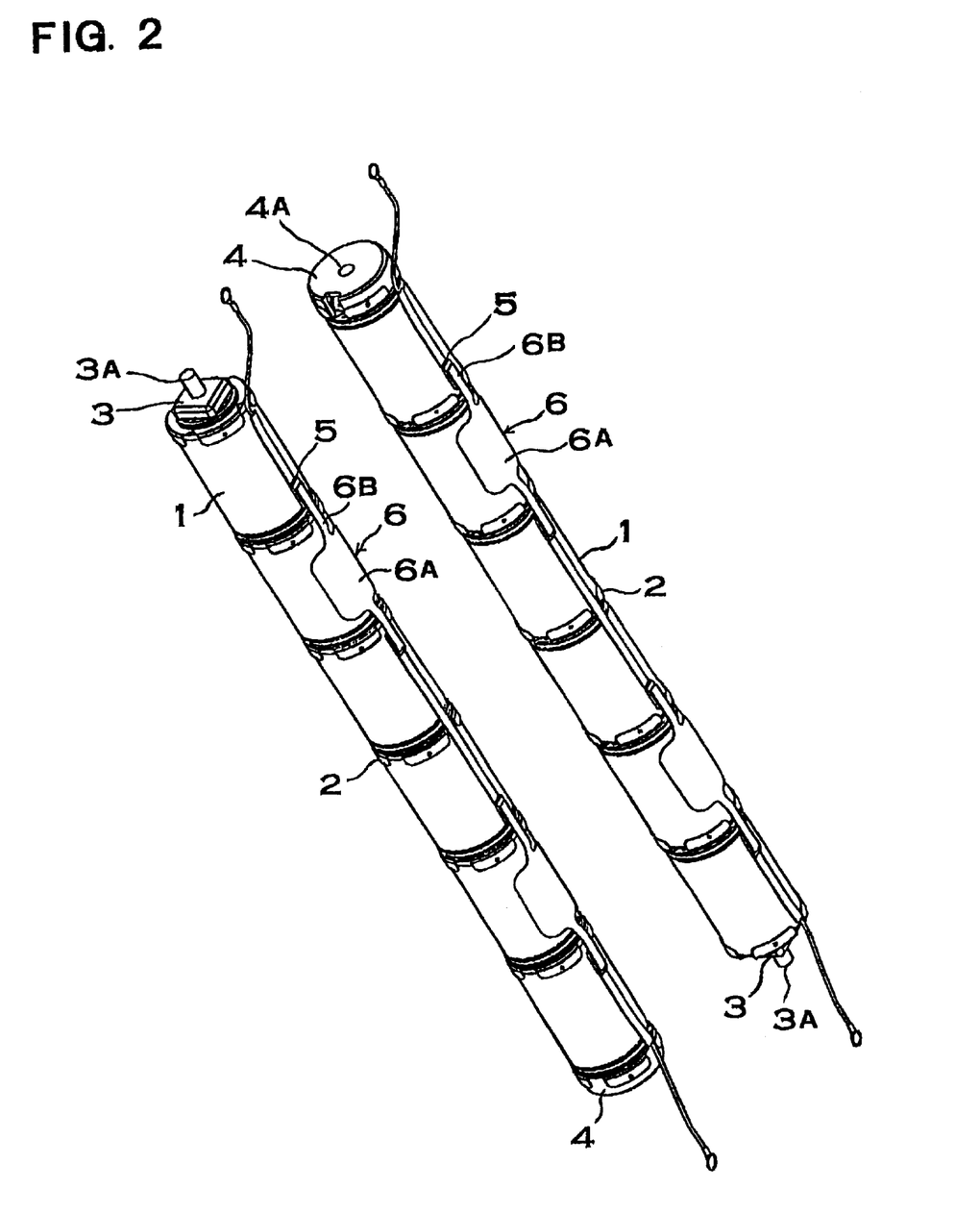
FIG. 2 is a perspective view of an embodiment of a battery unit according to the present invention.

In the battery unit, a dished connecting member 2 is spot-welded between each two cells 1. The connecting member 2 electrically connects two adjacent cells 1 in series and at the same time mechanically connects them. The battery unit comprising the connected six cells 1 is provided with positive and negative electrode terminals at ends thereof, respectively. The positive electrode terminal 3 has a projection 3A at the center thereof, while the negative electrode terminal 4 has a hole 4A at the center thereof.

By inserting the projection 3A of the positive electrode terminal 3 of a battery unit into the hole 4A of the negative electrode terminal 4 of another battery unit, they can be connected. Therefore, for example, two or three battery units, each having such a structure, can be longitudinally connected with each other into a longer cylindrical shape containing 12 or 18 cells. Further, since the positive electrode terminal 3 and the negative electrode terminal 4 have such different shapes from each other, battery units can be prevented from being positioned in erroneous directions when they are arranged laterally in parallel.

A plural number of battery units according to the present invention, each comprising six cells, can be arranged and contained in a case or the like so as to function as an electric power device. The cells connected in the electric power device can be increased in number by connecting an increased number of battery units, and such an electric power device can be used as an electric power device for an electric car which requires high power and high voltage.

In the battery unit shown in FIG. 2, a temperature sensor 5 and a heat collecting member 6 are provided on the surface of each cell. The temperature sensor 5 comprises an element such as a PTC element whose resistance changes as temperature changes. The temperature sensor 5 is so designed that the higher temperature becomes, the more greatly the resistance changes, and that resistance greatly changes in an atmosphere of 60° C. to 120° C. On the other hand, the main material of the heat collecting member 6 is one selected from the group consisting of iron, nickel, copper, aluminum and an alloy containing either of these metals.

The heat collecting member 6 can collect heat of the cell 1 to which the heat collecting member 6 is adhered and maintain the temperature of the heat. The heat maintained by the heat collecting member 6 is transferred from the heat collecting member 6 to the temperature sensor 5. Thereby, the temperature sensor 5 can detect the heat of the cell to which the heat collecting member 6 is adhered. Consequently, the temperature sensor 5 is preferably disposed adjacent to the heat collecting member 6.

In the battery unit shown in FIG. 2, the six cells 1 are provided with four temperature sensors 5 and two heat collecting members 6. The four temperature sensors 5 are adhered to the surfaces of two opposite end cells 1 and two middle cells 1 of the six cells 1. The two heat collecting members 6 are adhered to the surfaces of the remaining two cells 1. Therefore, the heat collecting member 6 is disposed between two temperature sensors 5. The heat collecting members 6 together with the temperature sensors 5 are formed into a long and narrow strip. The strip comprising the heat collecting members 6 and the temperature sensors 5 is wholly laminated with a resin or the like and thereby insulated from the outer cases of the cells 1. The temperature sensors 5 and the heat collecting members 6 formed into a strip and laminated, together with the battery unit comprising the six cells 1, are covered with a heat-shrinkable tube (not shown), to be in close adhesion to the cells 1. The heat collecting members 6 which are in close adhesion or disposition to the cells 1 can collect the heat of the cells 1. The size of each of the heat collecting members 6 is in the range of 3% to 60% of the surface area of the cell 1. By making the heat-collecting member 6 large in size, the heat of the cell 1 can be more effectively collected, but sometimes the radiating effect of the cell 1 is reduced. Therefore, an optimum size of the heat-collecting member 6 is selected by taking into account the radiating effect of the cell 1.

In addition, the heat collecting member 6 comprises a heat collecting section 6A for collecting heat of the cell 1 and two connecting leg sections 6B for connection with the temperature sensor 5, the connecting leg sections 6B protruding from the opposite ends of the heat collecting section 6A respectively. Each connecting leg section 6B is adhered onto the temperature sensor 5.

Further, the heat collecting member 6 can have, for example, two-layer structure. In this case, the heat collecting member 6 comprises an inner contact with the cell 1 and an outer layer not in contact with the cell 1. The outer layer is made of a material having a heat conductivity that is lower than that of the inner layer, so that heat collected by the heat collecting member 6 can be maintained.

Figure 3:
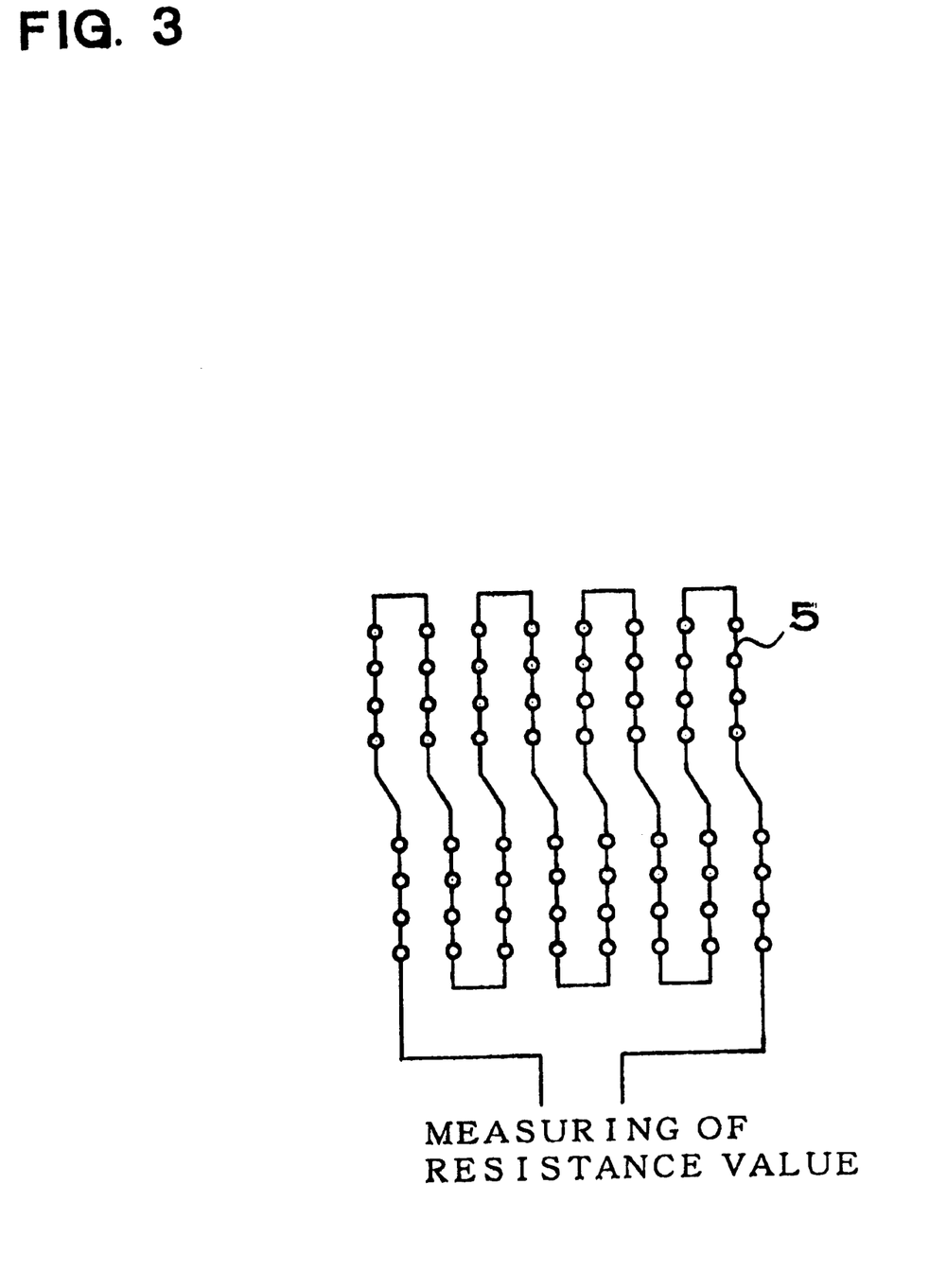
FIG. 3 is a connecting circuit diagram of a temperature sensor.

In this battery unit, the temperature sensors 5 are electrically connected in series with each other in a route different from that of the cells connected in series. FIG. 3 is an example of a circuit diagram connecting in series all of the temperature sensors 5 adhered to all of the battery units in an electric power device comprising a plural number of battery units. However, instead of connecting all the temperature sensors 5 in series, the temperature sensors 5 contained in every two or every three battery units can be connected in series, and then whole of them can be connected in parallel.

The resistance of the temperature sensors 5 connected in series changes by an abnormal temperature rise of a cell to which the temperature sensor is adhered. Therefore, if an abnormal temperature rise of only one cell occurs, the temperature sensors 5 connected in series can detect it and can detect electric power device trouble. Since the heat collecting members 6 comprise metal or a like heat conductive member, they can also serve as lead plates for connecting the temperature sensors with one another.

Figure 4:
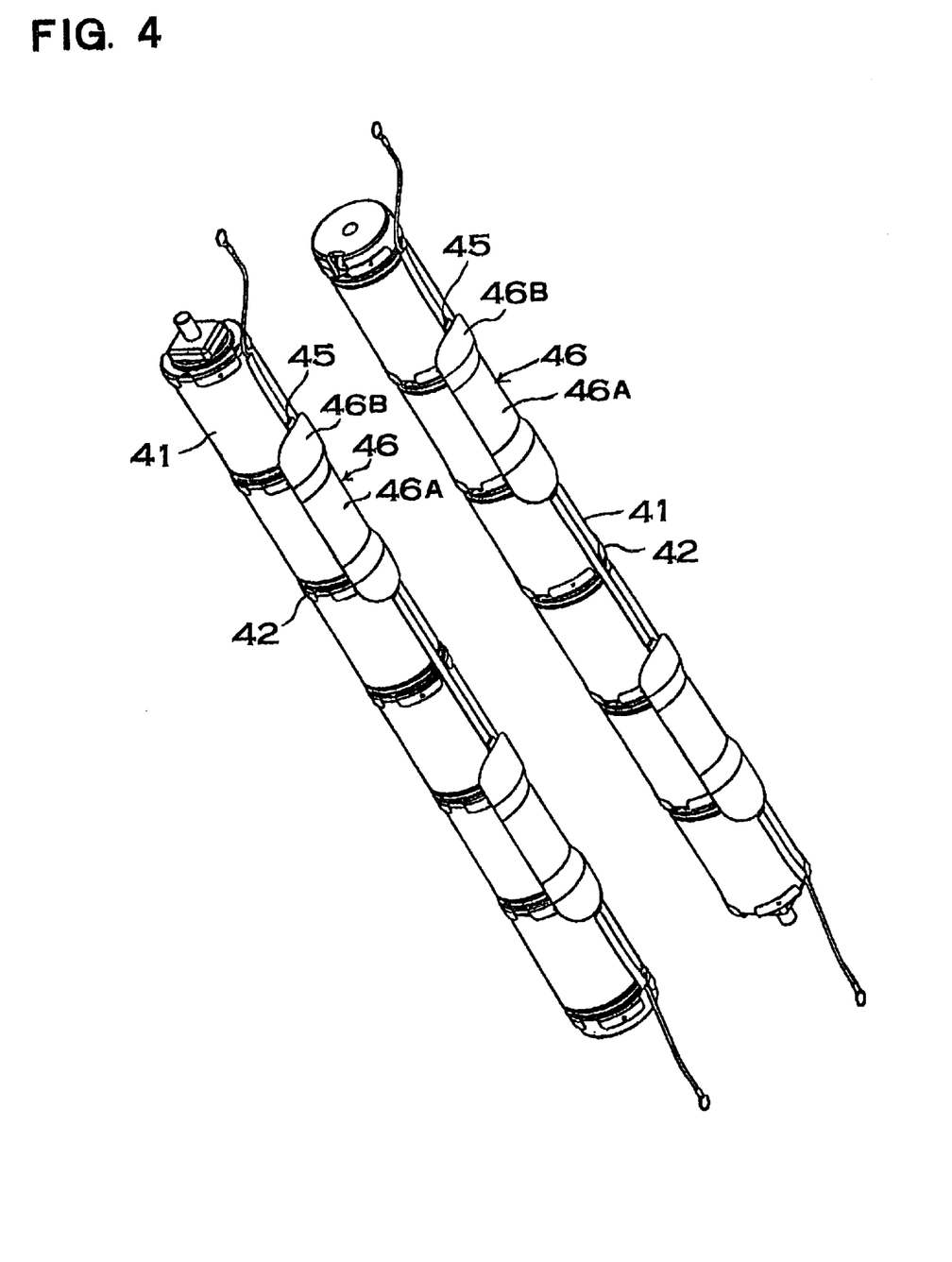
FIG. 4 is a perspective view of another embodiment of a battery unit according to the present invention.

FIG. 4 shows another embodiment of the present invention in which a connecting leg section 46B for connecting a heat collecting member 46 to a temperature sensor 45 is formed to be large in size to cover the whole temperature sensor 45. The heat collecting member 46 having such a structure can more precisely transfer collected temperature data to the temperature sensor 45. In this Figure, numeral 41 indicates a cell, numeral 42 indicates a dished connecting member and numeral 46A indicates a heat collecting section.

Figure 5:
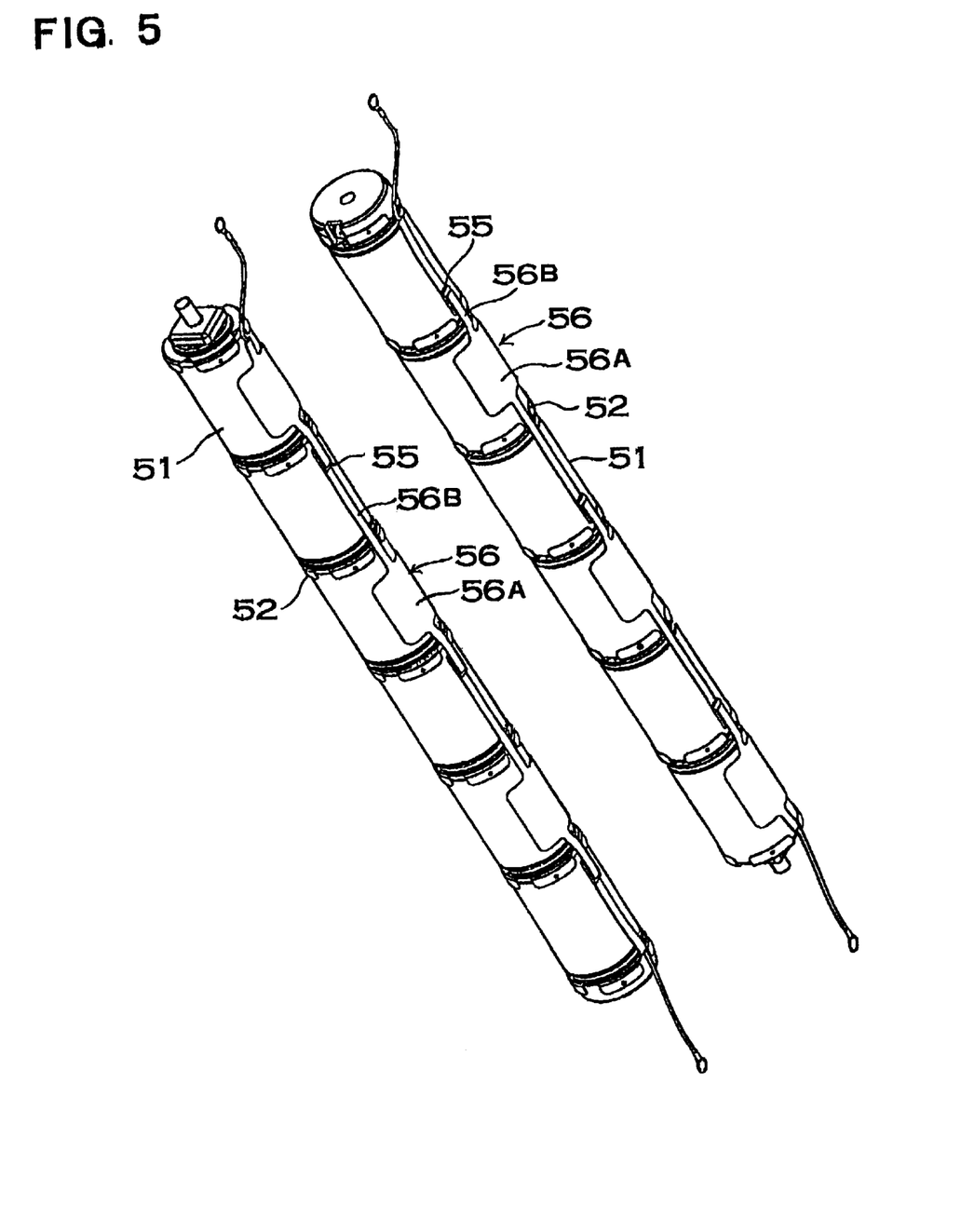
FIG. 5 is a perspective view of another embodiment of a battery unit according to the present invention.
Figure 6:
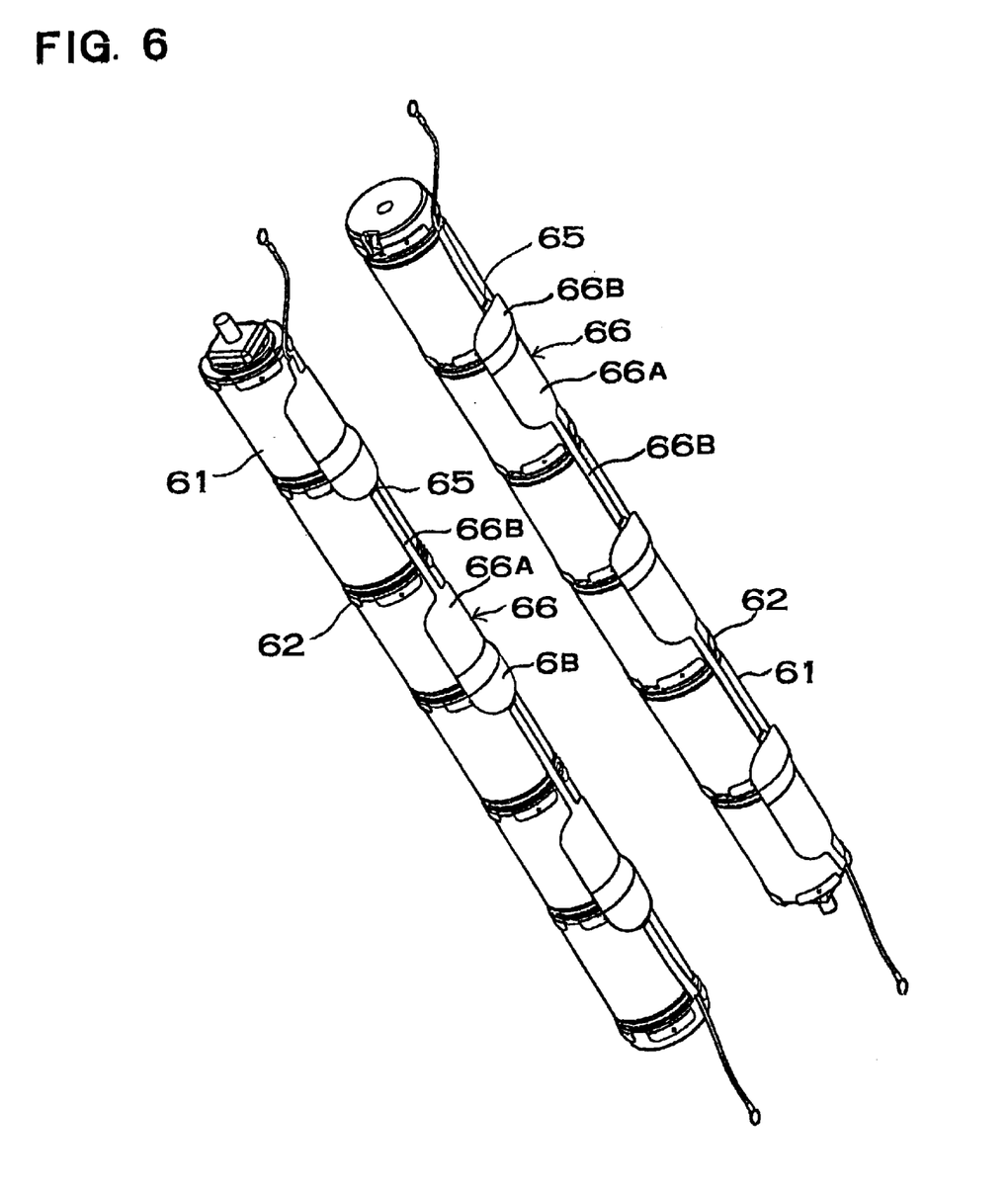
FIG. 6 is a perspective view of another embodiment of a battery unit according to the present invention.

FIGS. 5 and 6 show other different embodiments of the present invention, in which three temperature sensors 55, 65 and three heat collecting members 56, 66 are adhered to six connected cells 51, 61. In these embodiments, the heat collecting members 56, 66 are provided adjacent to the temperature sensor 55, 65 so that the temperature sensors 55, 65 are disposed alternately with the heat collecting members 56, 66. By changing and controlling number of the temperature sensors and heat collecting members with respect to the number of the cells in such a manner, the number of the temperature sensors can be reduced. Thus, the heat collecting members and temperature sensors are included into the battery unit with the heat collecting members connected to the temperature sensors. By providing one temperature sensor for every two cells, two cells can be monitored by one temperature sensor. Also, by providing two temperature sensors for every three cells, three cells can be monitored by two temperature sensors. Further, by providing one temperature sensor for every three cells, three cells can be monitored by one temperature sensor. In these Figures, numerals 51, 61 indicate the cells, numerals 52, 62 indicate the dished connecting members, numerals 56A, 66A indicate the heat collecting sections and numerals 56B, 66B indicate the connecting leg sections.

Figure 7:
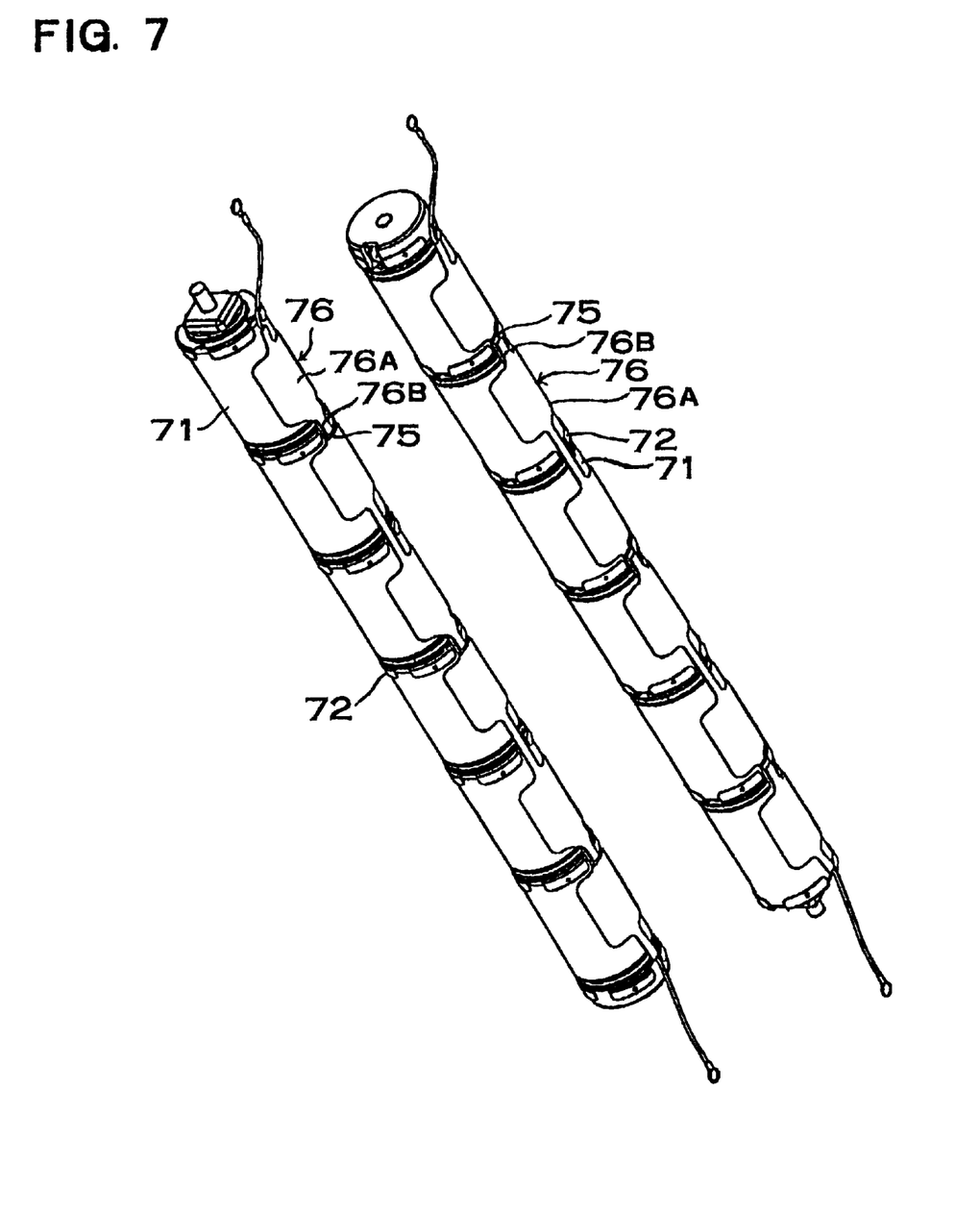
FIG. 7 is a perspective view of another embodiment of a battery unit according to the present invention.

FIG.7 shows a further different embodiment of the present invention in which three temperature sensors 75 and six heat collecting members 76 are provided for the six cells. In the battery unit shown in FIG. 7, the temperature sensor 75 is disposed between two cells 71 and in a position opposed to a dished connecting member 72. Each of the heat collecting members 76 is adhered to one of the six cells, and connecting leg sections 76B of two adjacent heat collecting members 76 are connected to the outer surface and the inner surface of the temperature sensor 75, respectively. Further, on every two cells 71 of the middle four cells, except two opposite end cells of the six cells 71, the heat collecting member 76 comprising two integrated heat collecting sections 76A is disposed. By using this heat collecting member 76, two heat collecting sections 76A of only one heat collecting member 76 can be adhered to the surfaces of the two cells, respectively. As a result, necessary heat collecting members can be reduced in number, and thereby, parts and assembling processes can be also reduced in manufacturing battery units.

As mentioned above, in the battery unit shown in FIG. 7, since the heat collecting members 76 are disposed on all of the cells 71 and the heat collecting members are connected to the temperature sensors 75, an abnormal temperature rise of all of the six cells 71 can be detected by three temperature sensors 75. The number of temperature sensors 75 disposed between the cells can be appropriately changed.

Figure 8:
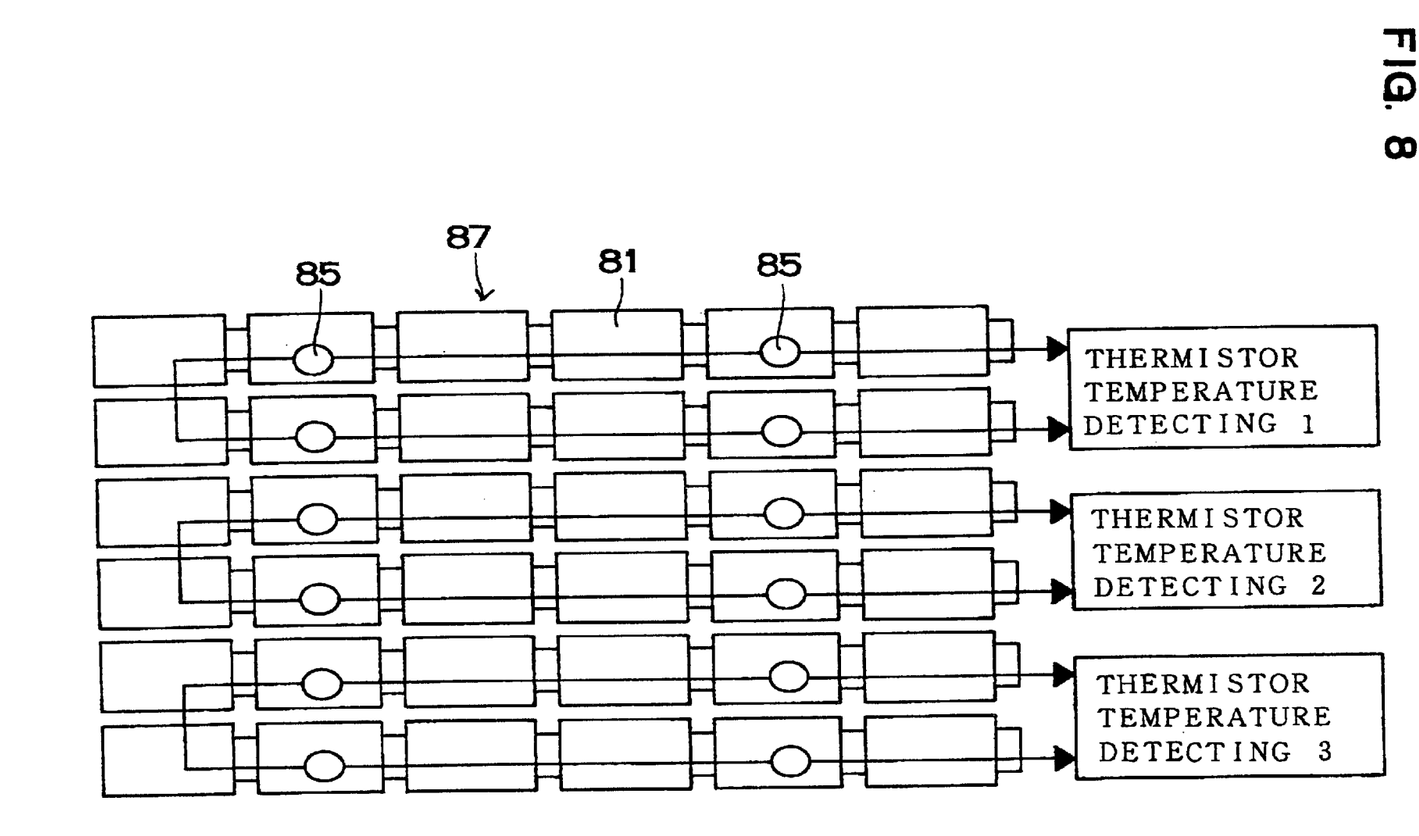
FIG. 8 is a perspective view of another embodiment of a battery unit according to the present invention.
Figure 9:
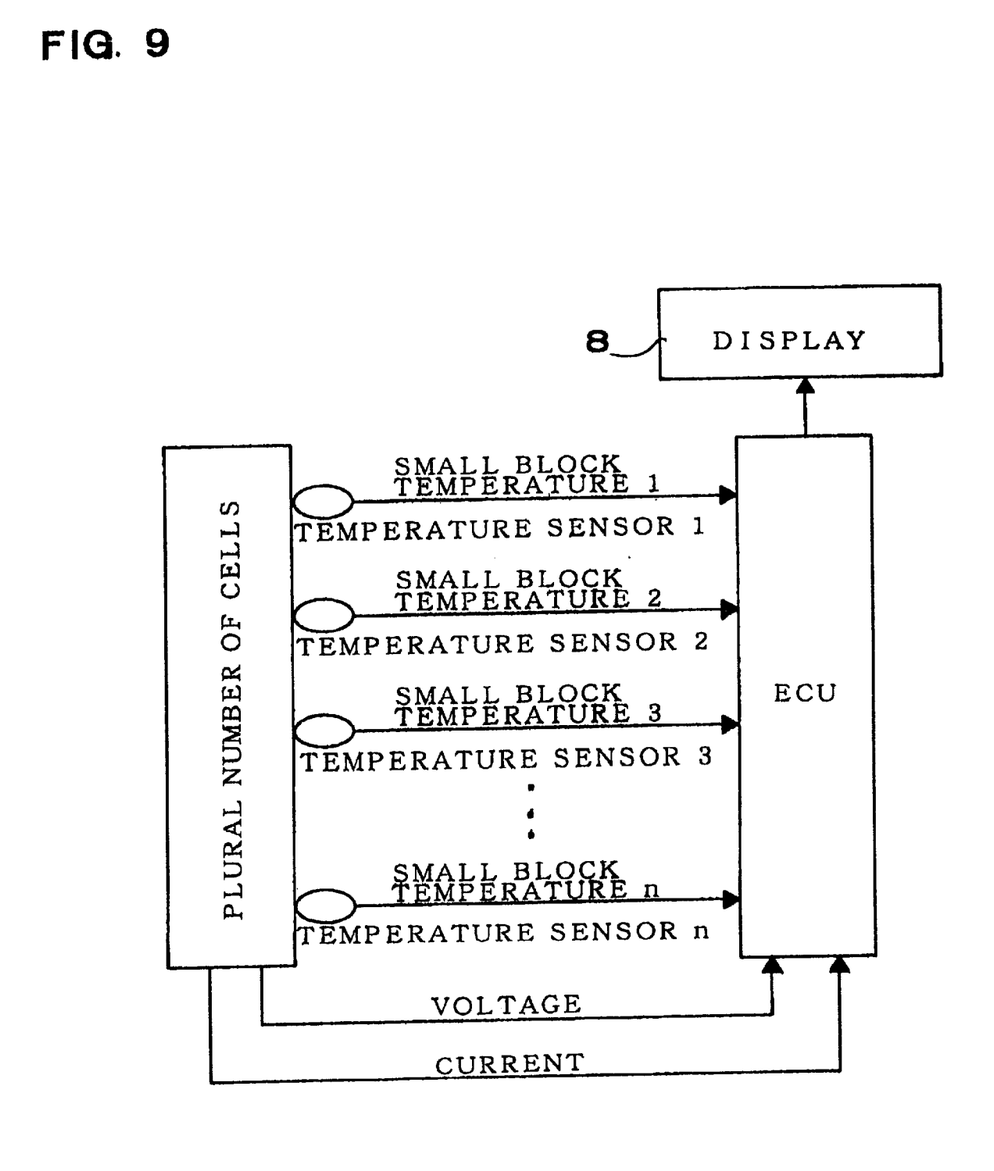
FIG. 9 is a temperature detecting circuit diagram of the battery unit of FIG. 8.

Now, another embodiment of the present invention shown in FIGS. 8 and 9 will be described. Unlike the above-mentioned embodiments shown in FIGS. 2 to 7, the battery unit shown in FIGS. 8 and 9 is not provided with any heat collecting member. In the battery unit shown FIG. 8, six cells 81 constitute a battery module 87. A plural number of battery modules connected in series constitute a battery unit.

The number of battery modules 87 connected in a battery unit can be optionally selected. By connecting, for example, 32 battery modules, a battery unit comprising 192 cells connected to each other can be obtained. Also, more battery modules can be connected. Further, the number of cells constituting a battery module can also be optionally selected, and more than six or less than six cells can constitute a battery module.

In the battery unit shown in FIG. 8. a battery module 87 is constituted of six cells 81 which are connected in series to form a cylindrical shape. Two of the six cells 81 of the battery module 87 are each provided with a temperature sensor 85, and the remaining four cells 81 are not provided with any temperature sensor. In each of remaining battery modules 87, similarly, two of the six cells 81 are each provided with a temperature sensor 85. Therefore, with this structure, the number of temperature sensors 85 can be reduced in comparison with a case in which each cell 81 is provided with a temperature sensor 85. However, the number of temperature sensors 85 and the space between the temperature sensors 85 in a battery module are not limited by the above-mentioned description, and may be optionally determined.

Further, in the battery unit shown in FIG. 8, a total of four temperature sensors 85 are connected to one another in series so that two battery modules 87 constitute a small block and four temperature sensors 85 constitute a small block. The battery unit is divided into a plural number of small blocks. At every small block, the temperature of the temperature sensor 85 is detected. The temperature sensor 85 may comprise a PTC element or a thermistor. A PTC element has a characteristic that a resistance thereof rapidly changes when it reaches the working temperature. If the working temperature is, for example, 93° C., the temperature sensor 85 comprising a PCT element sometimes cannot detect an abnormal temperature rise until the temperature of the cell reaches near 100° C. Therefore, sometimes it takes a lot of time for the temperature sensor 85 to detect an abnormal temperature rise.

On the other hand, a thermistor has a characteristic that resistance thereof gradually changes while temperature changes from low (−20° C.) to high (150° C.). The temperature sensor 85 comprising a thermistor can rapidly detect an abnormal temperature rise by comparing temperature with a regulation value and controlling selection of the regulation value. Further, a unit price of a thermistor is low in comparison with that of a PTC element, and the production cost of a temperature sensor 85 can be reduced.

FIG. 9 is a diagram of a temperature detecting circuit in which a control unit ECU and a display 8 are connected to the battery unit shown in FIG. 8. Temperature data of the temperature sensors 85 divided to form a small block is inputted in the control unit ECU.

An absolute temperature of each small block is detected and compared with a predetermined regulation value and thereby, an abnormal temperature rise can be detected. The regulation value is set, for example, at 60° C. When the abnormal temperature rise is detected at every small block, the display 8 indicates which small block is in abnormal state. As a result, even in a battery unit in which a large number of cells are connected, abnormal points can be easily detected.

Further, since the range of the abnormal portion can be detected at every small block, maintenance such as exchange and repairing can be easily carried out. The control unit ECU can compare inputted the temperature signal of each small block with the regulation value at every. small block. By this, the temperature difference between the small blocks, that is the temperature dispersion can be detected. For example, if the detected temperature of a small block is 80° C. and the detected temperatures of the other small blocks are normal temperatures of 45° C. to 50° C., the temperature difference between them is detected. When the temperature difference is above a regulation value, it is judged and detected that the battery unit is in an abnormal state i.e. that an abnormal cell or cells are included in the battery unit. In this case, the display 8 can indicate which small block is in the abnormal state.

In the embodiment shown in FIGS. 8 and 9, since the temperature sensors 85 are divided into small blocks and the abnormal temperature detection of each small block is carried out as mentioned above, detection of the abnormal state in small range of the small block can be achieved with a lower number of temperature sensors than that of the number of cells connected in the battery unit. Further, since the control unit ECU uses the inputted temperature data of the small blocks as parameters of self-discharging and charging efficiency and controls battery conditions such as remaining capacity, detailed calculations of battery conditions can be achieved with the inputted temperature data of each small block.

Figure 10:
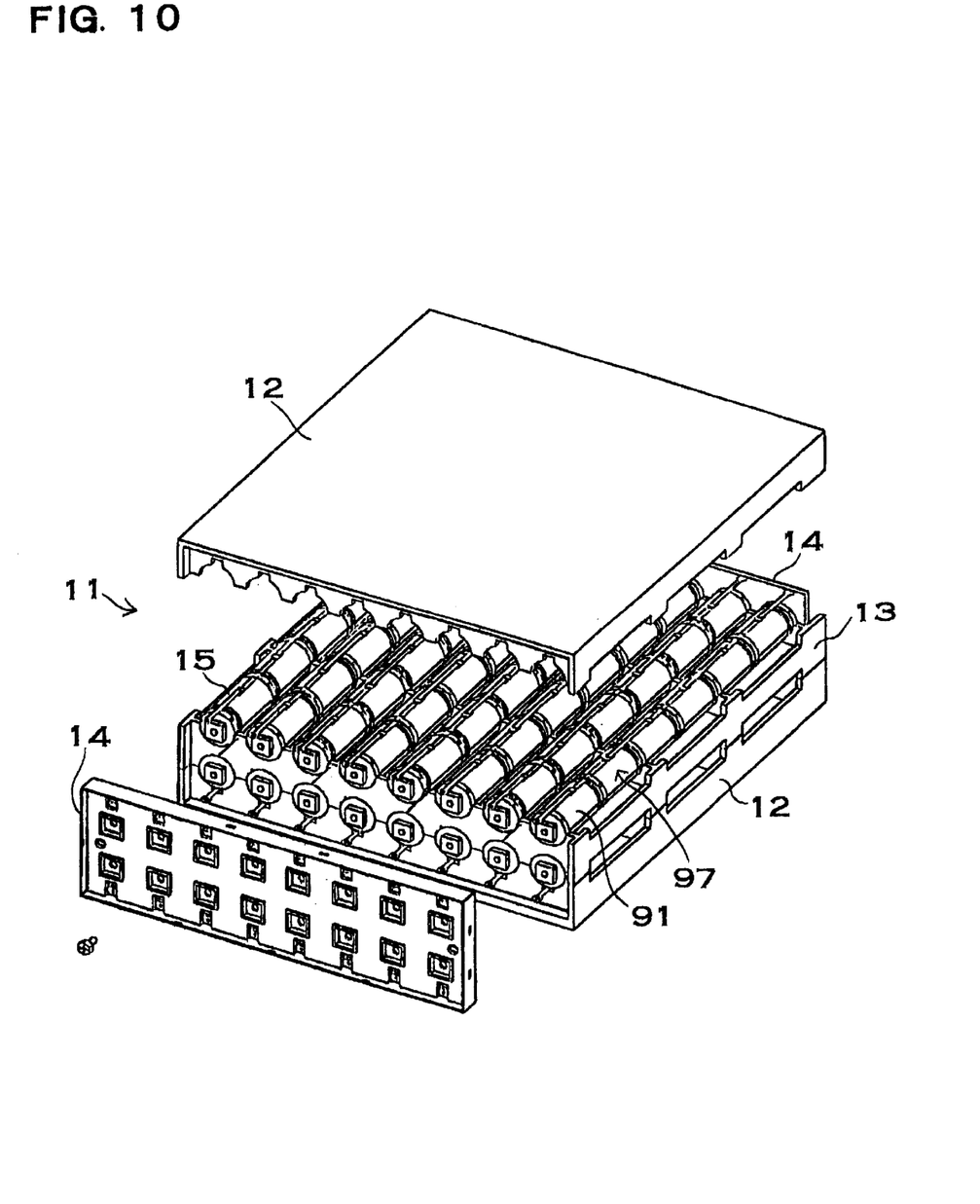
FIG. 10 is an exploded perspective view of another embodiment of a battery unit according to the present invention.

Further, a battery unit according to the present invention in which a plural number of temperature sensors are divided into temperature sensor blocks is used as battery sources for electric cars. and hybrid-type cars in which a driving source comprises a combination of an internal combustion engine and a battery-driven motor. FIG. 10 is an exploded perspective view of an appearance of a battery unit according to the present invention for use as a battery source. This battery source 11 has a rectangular parallelepiped shape enclosed with upper and lower holder cases 12, an intermediate case 13 and end plates 14 on both sides.

Figure 11:
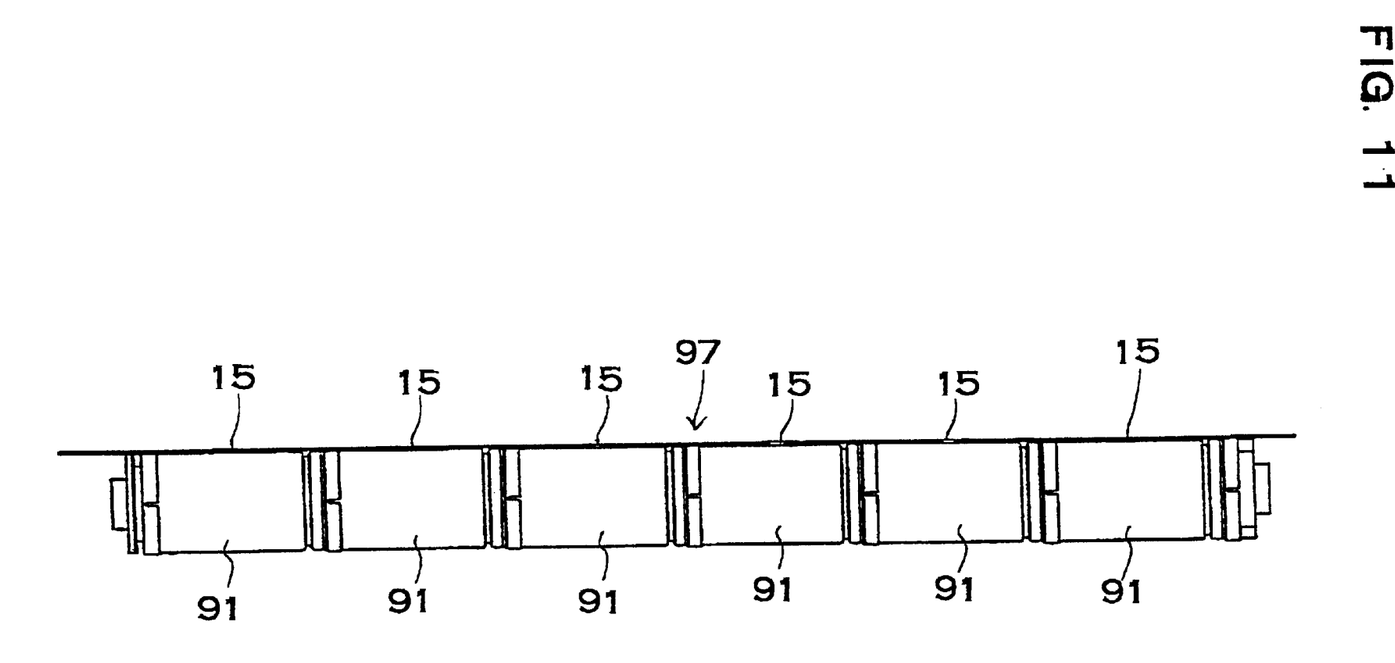
FIG. 11 is a plan view of a battery module of the battery unit of FIG. 10.

As shown in FIG. 11, the battery source 11 contains therein battery modules 97 in each of which are six cylindrical cells longitudinally connected to form a cylindrical shape and all of the six cells are electrically connected in series. Eight battery modules 97 having such a structure are laterally arranged, and above this arrangement of eight battery modules 97, a similar arrangement of eight battery modules 97 is layered by means of the intermediate case 13. As a result, a total of 96 cells 91 are contained in the battery source 11, and all of these 96 cells are connected in series by lead plates provide on the end plates 14. Further, by connecting a plural number of such battery sources each containing 96 cells, the number of the connected cells can be increased to an integral multiple of 96. Therefore, the battery source 11 can provide necessary electric source voltage, output current and the like, in accordance with the size and output of an electric car.

In the battery module 97 comprising six cells 91 longitudinally connected to form a cylindrical shape, PTC sensors are used as the temperature sensors. In the following embodiment, PTC sensors 15 are used as the temperature sensors. Therefore, the temperature sensor blocks are used as the PTC sensor blocks. The PTC sensors 15 are fixed to the outside of the battery module 97. In the battery module 97 shown in this Figure, one PTC sensor 15 is adhered to each of the cells. Therefore, the temperature sensor blocks are the PTC sensor blocks of the cells 91. Six PTC sensors 15 are connected longitudinally in a line by lead plates so as to correspond to the connected six cells 91. The lead plates extended from the opposite ends of the connected six PTC sensors 15 are electrically connected through the end plates 14 to the lead plates of the connected six PTC sensors 15 adhered the adjacent battery module.

Thereby all of the PTC sensors 15 adhered to all of the 96 cells contained in the battery source 91 respectively can be electrically connected. Though all of the PTC sensors can be connected in series as mentioned above, PTC sensors adhered to, for example, every two battery modules, that is, adhered to every 12 cells may be connected in series. The PTC sensors are connected in series in blocks of a battery module in such a manner, and electric signals can be taken out from the PTC sensors by extending each lead plate. Further, it is not necessary to adhere PTC sensors to all of the cells respectively, but PTC sensors may be adhered to every other cell so that three PTC sensors are adhered in a battery module.

The PTC sensors 15 adhered as mentioned above can constitute a circuit of only the PTC sensors 15 in a different route from that of the series circuit of .the cells 91 through which a large current flows. Therefore, since the circuit of the PTC sensors can be a small current circuit, heat generation can be prevented even if a large number of PTC sensors 15 are connected, and at the same time, a reduction of the battery power output by the voltage reduction caused by the PTC sensors can be prevented.

Figure 12:
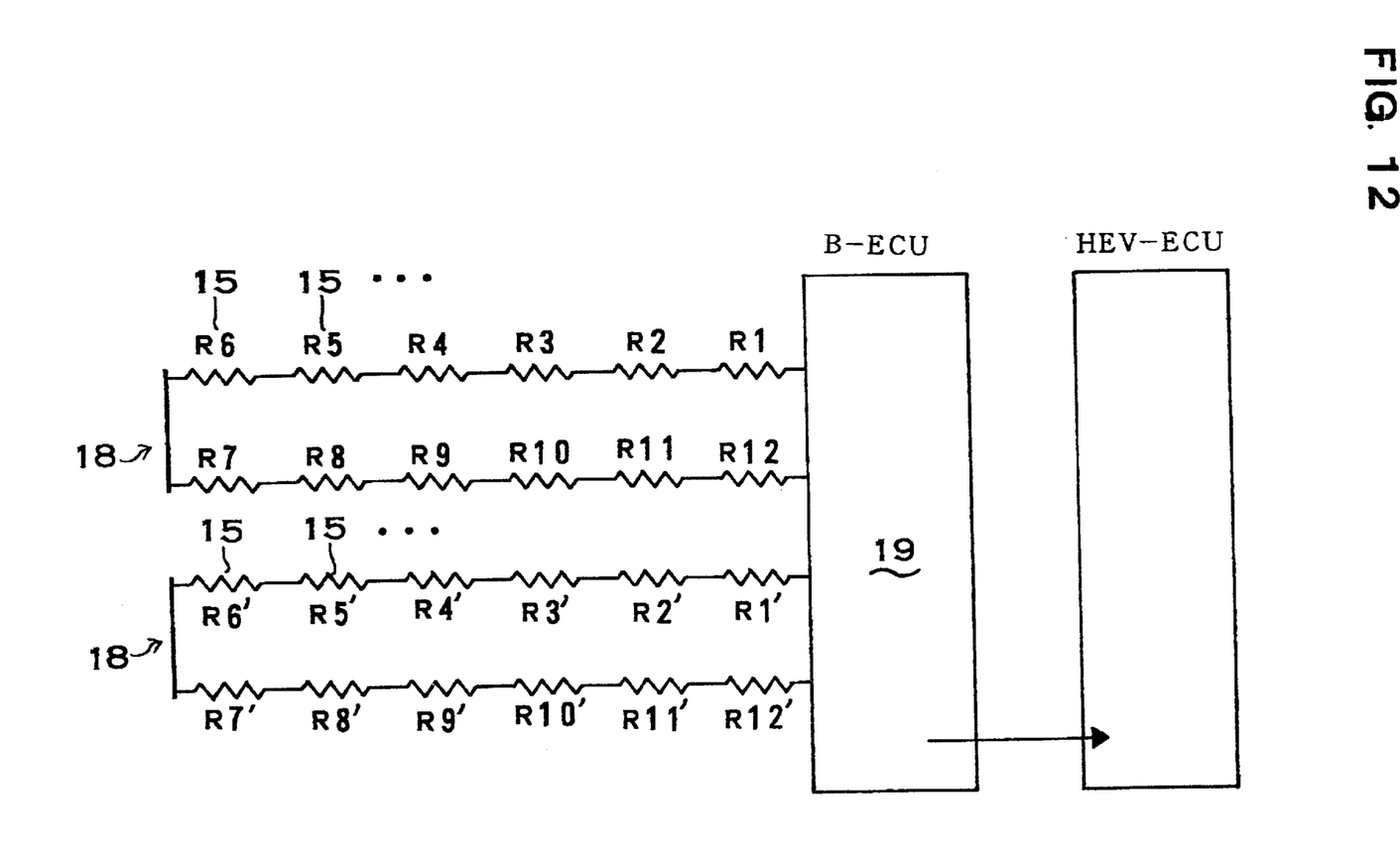
FIG. 12 is a circuit diagram of an abnormal temperature rise detecting device.

In this embodiment, as shown in FIG. 12, every 12 PTC sensors 15 adhered to the 12 cells, respectively, are connected in series to constitute a PTC sensor block 18. Therefore, the PTC sensors 15 adhered to the 96 cells 91 of the battery source 11, respectively, are divided into eight PTC sensor blocks 18, and the PTC sensors 15 of each PTC sensor block are connected in series.

Each of these PTC sensor blocks 18 is connected to an abnormal temperature rise detecting circuit 19. Now, operation of the abnormal temperature rise detecting circuit 19 will be described in the following.

(1) The abnormal temperature rise detecting circuit 19 measures resistance values of all of the PTC sensor blocks 18 connected thereto.

(2) The measured resistance values of the PTC sensor blocks 18 are compared with one another, and a difference between the measured values of two PTC sensor blocks 18 is calculated.

(3)The difference is compared with a predetermined value preliminary inputted in the abnormal temperature rise detecting circuit 19, and when the difference is above the predetermined value, an abnormal temperature rise is detected.

(4) When the abnormal temperature rise is detected, an abnormality signal is outputted to the control unit ECU of the battery source 11, and the ECU informs that the cell(s) are in an abnormal state.

In this manner, the abnormal temperature rise detecting circuit 19 connects in series the PCT sensors of each PTC sensor block, measures resistance of each PTC sensor block, and detects an abnormal temperature rise when the difference between the resistance of two PTC sensors is above a predetermined value.

Therefore, since the difference between the resistance of PTC sensor blocks is calculated, differences, i.e. dispersions of temperature characteristic of PTC sensors, are off set. Consequently, when the abnormal temperature rise of any cell is caused and the resistance value of the PTC sensor 15 to which the cell is adhered increases extremely, only the increased value can be precisely detected, since the dispersions of the PTC sensors are off set.

As a result, the detection can be achieved not erroneously, but precisely, without the influence of the dispersion of the PTC sensors, respectively. At the same time, the abnormal temperature rise detecting circuit can sensitively respond to the resistance increase without the necessity of setting the predetermined value as an undesirably large value because of the dispersion of the PCT sensors is off set, and thereby, the detecting time can be shortened.

Further, since the PTC sensors 15 are divided into the PCT sensor blocks 78, if an abnormal temperature is caused in any one of 96 cells 91, the detection can be carried out in every PTC sensor block and thereby, treatment such as mending or exchange can be achieved in a rather narrow range to speed up the maintenance inspection and the like.

The abnormal temperature rise detecting circuit 19 measures a resistance value of each PTC sensor block 18 and calculates a difference between the resistance values, as mentioned above. However, the present invention is not limited to this and the abnormal temperature rise may be detected by calculating ratios or multiplication factors of the measured values of the PTC sensor blocks and comparing them with each other.

As the present invention may be embodied in several forms without departing from the spirit of essential characteristics thereof, the present embodiment is therefore illustrative and not restrictive, since the scope of the present invention is defined by the appended claims rather than by the description preceding them, and all changes that fall within the metes and bounds of the claims, or equivalence of such metes and bounds thereof are therefore intended to be embraced by the claims.

What is claimed is:

1. A battery unit comprising:

a plurality of cells connected in series or in parallel; and a plurality of temperature sensors operable to detect cell temperature, each of said plurality of temperature sensors being connected adjacent to a surface of one of said plurality of cells, wherein a total number of said plurality of temperature sensors is less than a total number of said plurality of cells.

2. A battery unit as claimed in claim 1, wherein each of said plurality of temperature sensors is one of a PTC element and a thermistor.

3. A battery unit as claimed in claim 1, wherein said plurality of cells are divided into a plurality of small blocks of cells, each of said plurality of small blocks of cells comprising a plural number of said plurality of cells connected together, and wherein said battery unit further comprises a control unit operable to receive outputs from said plurality of temperature sensors and operable to perform calculations on the outputs of said plurality of temperature sensors of said plurality of small blocks of cells.

4. A battery unit as claimed in claim 1, further comprising at least one heat collecting member connected to each of at least one of said plurality of cells without one of said plurality of temperature sensors disposed thereon, wherein said at least one heat collecting member is operable to collect heat from said at least one of said plurality of cells without one of said plurality of temperature sensors disposed thereon and transfer temperature data of said at least one of said plurality of cells without one of said plurality of temperature sensors disposed thereon to one of said plurality of temperature sensors.

5. A battery unit as claimed in claim 4, wherein one of said plurality of cells with one of said plurality of temperature sensors disposed thereon and one of said at least one of said plurality of cells without one of said plurality of temperature sensors disposed thereon and connected to said heat collecting member are disposed adjacent to each other and connected to each other.

6. A battery unit as claimed in claim 4, wherein one of said plurality of temperature sensors is disposed at a position on said surface of one of said plurality of cells near an adjacent one of said at least one of said plurality of cells without one of said plurality of temperature sensors disposed thereon and provided with said heat collecting member.

7. A battery unit as claimed in claim 4, wherein a main material of said heat collecting member is one selected from the group consisting of iron, nickel, copper, aluminum and an alloy containing one of these metals.

8. A battery unit as claimed in claim 4, wherein said plurality of cells comprise a plural number of cells each provided with one of said plurality of temperature sensors and a plural number of cells each provided with said heat collecting member, and wherein said plurality of temperature sensors are electrically connected in series to one another through said heat collecting members.

9. A battery unit as claimed in claim 4, wherein said plurality of cells comprise a plural number of cells each provided with one of said plurality of temperature sensors and a plural number of cells each provided with said heat collecting member, and wherein each of said plural number of cells provided with said heat collecting member is disposed between a pair of said plural number of cells each provided with one of said plurality of temperature sensors.

10. A battery unit as claimed in claim 4, wherein one of said plurality of temperature sensors is disposed between two adjacent cells of said plurality of cells, and wherein each of said two adjacent cells on each side of said one of said plurality of temperature sensors is provided with said heat collecting member.

11. A battery unit comprising:

a plurality of cells;

a plurality of temperature sensors adhered to said plurality of cells, wherein a resistance of each of said plurality of temperature sensors changes during temperature rise; and an abnormal temperature rise detecting circuit operable to measure resistances of said plurality of temperature sensors and operable to detecting an abnormal temperature rise of a cell of said plurality of cells, wherein said plurality of temperature sensors are divided into a plurality of temperature sensor blocks and each of said plurality of temperature sensor blocks having a same number of temperature sensors connected in series, and wherein said abnormal temperature rise detecting circuit detects the abnormal temperature rise by comparing resistance values of said plurality of temperature sensor blocks with one another.

12. A battery unit as claimed in claim 11, wherein each of said plurality of temperature sensors is a PTC element.

13. A battery unit as claimed in claim 11, wherein said abnormal temperature rise detecting circuit compares the resistance values of said plurality of temperature sensor blocks with one another and detects the abnormal temperature rise when a difference of the resistance values is above a value.

* * * * *